US012344015B2

(12) United States Patent
Arai

(10) Patent No.: US 12,344,015 B2
(45) Date of Patent: Jul. 1, 2025

(54) PRINTER

(71) Applicant: Toshiba Tec Kabushiki Kaisha, Tokyo (JP)

(72) Inventor: Makoto Arai, Sunto Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 120 days.

(21) Appl. No.: 18/157,691

(22) Filed: Jan. 20, 2023

(65) Prior Publication Data

US 2023/0391113 A1 Dec. 7, 2023

(30) Foreign Application Priority Data

Jun. 1, 2022 (JP) ................................ 2022-089401

(51) Int. Cl.

*B41J 3/407* (2006.01)
*B41J 11/00* (2006.01)
*B41J 11/04* (2006.01)
*B41J 11/42* (2006.01)
*B41J 23/04* (2006.01)

(52) U.S. Cl.

CPC ......... *B41J 3/4075* (2013.01); *B41J 11/0095* (2013.01); *B41J 11/04* (2013.01); *B41J 11/42* (2013.01); *B41J 23/04* (2013.01)

(58) Field of Classification Search

CPC ...................................................... B41J 3/4075

See application file for complete search history.

(56) References Cited

U.S. PATENT DOCUMENTS

2010/0200166 A1* 8/2010 Watanabe ............ B65C 9/1865 156/384

FOREIGN PATENT DOCUMENTS

JP 09164742 A * 6/1997
JP 2001-039421 A 2/2001
JP 2003312936 A 11/2003
JP 201023327 A 2/2010

OTHER PUBLICATIONS

Extended European Search Report mailed Oct. 6, 2023 in corresponding European Patent Application No. 23160156.8, 8 pages.

* cited by examiner

*Primary Examiner* — Shelby L Fidler
(74) *Attorney, Agent, or Firm* — Kim & Stewart LLP

(57) ABSTRACT

A printer includes a platen roller conveying a label sheet, a first motor rotating the roller, a print head facing the roller and printing on a label of the sheet, a discharge port, a winding roller for winding the sheet from which the label has been detached, a second motor rotating the winding roller, a drive train by which a rotational force can be transmitted from the second motor to the winding roller, and a processor controlling the motors to rotate in a first direction to convey the sheet in a forward direction and controlling the head to print on a first label of the sheet, and after the label is discharged, controlling the motors to rotate in a second direction opposite to the first direction. The drive train disengages the winding roller from the second motor when the second motor is controlled to rotate in the second direction.

18 Claims, 7 Drawing Sheets

PRINTER

CROSS-REFERENCE TO RELATED APPLICATION(S)

This application is based upon and claims the benefit of priority from Japanese Patent Application No. 2022-089401, filed Jun. 1, 2022, the entire contents of which are incorporated herein by reference.

FIELD

Embodiments described herein relate generally to a printer and a method carried out thereby.

BACKGROUND

Conventionally, a printer that performs printing on a label has been known. For example, in a printer that performs printing on a base sheet on which a plurality of labels are attached at predetermined intervals, the wound base sheet is fed out to a print head such as a thermal head, thereby performing printing on the surface of the label.

Further, in a printer including a mechanism for peeling a printed label from a base sheet, a winding shaft is rotated by a drive source such as a motor, and the base sheet from which the label has been peeled is wound up by the winding shaft. Further, in such a printer, when the printing of the label is completed, a back feed is performed to convey the base sheet in a direction opposite to that at the time of printing so that the next label is returned to the print start position of the print head.

When the back feed is performed, the base sheet wound around the winding shaft is pulled out from the winding shaft while resisting the load caused by a non-exciting torque or the like of the drive source. Therefore, when the back feed is performed, slippage is likely to occur in the conveyance of the base sheet due to the influence of the load, and there is a possibility that the conveyance cannot be accurately performed.

SUMMARY OF THE INVENTION

Embodiments of the present invention provide a printer capable of performing a back feed with high accuracy.

In one embodiment, a printer for printing on a label sheet including a plurality of detachable labels, includes a platen roller configured to convey the label sheet, a first motor configured to rotate the platen roller, a print head facing the platen roller and configured to print on a label of the label sheet, a discharge port through which the printed label is discharged and detached, a winding roller for winding the label sheet from which the printed label has been detached, a second motor configured to rotate the winding roller, a drive train by which a rotational force can be transmitted from the second motor to the winding roller, and a processor. The processor is configured to control the first and second motors to rotate in a first direction to convey the label sheet in a forward direction along a conveyance path and control the print head to print on a first label of the label sheet, and after the printed first label is discharged, control the first and second motors to rotate in a second direction that is opposite to the first direction. The drive train disengages the winding roller from the second motor when the second motor is controlled to rotate in the second direction.

DETAILED DESCRIPTION

Hereinafter, embodiments will be described in detail with reference to the drawings. The present invention is not limited to the embodiments described below.

Figure 1:
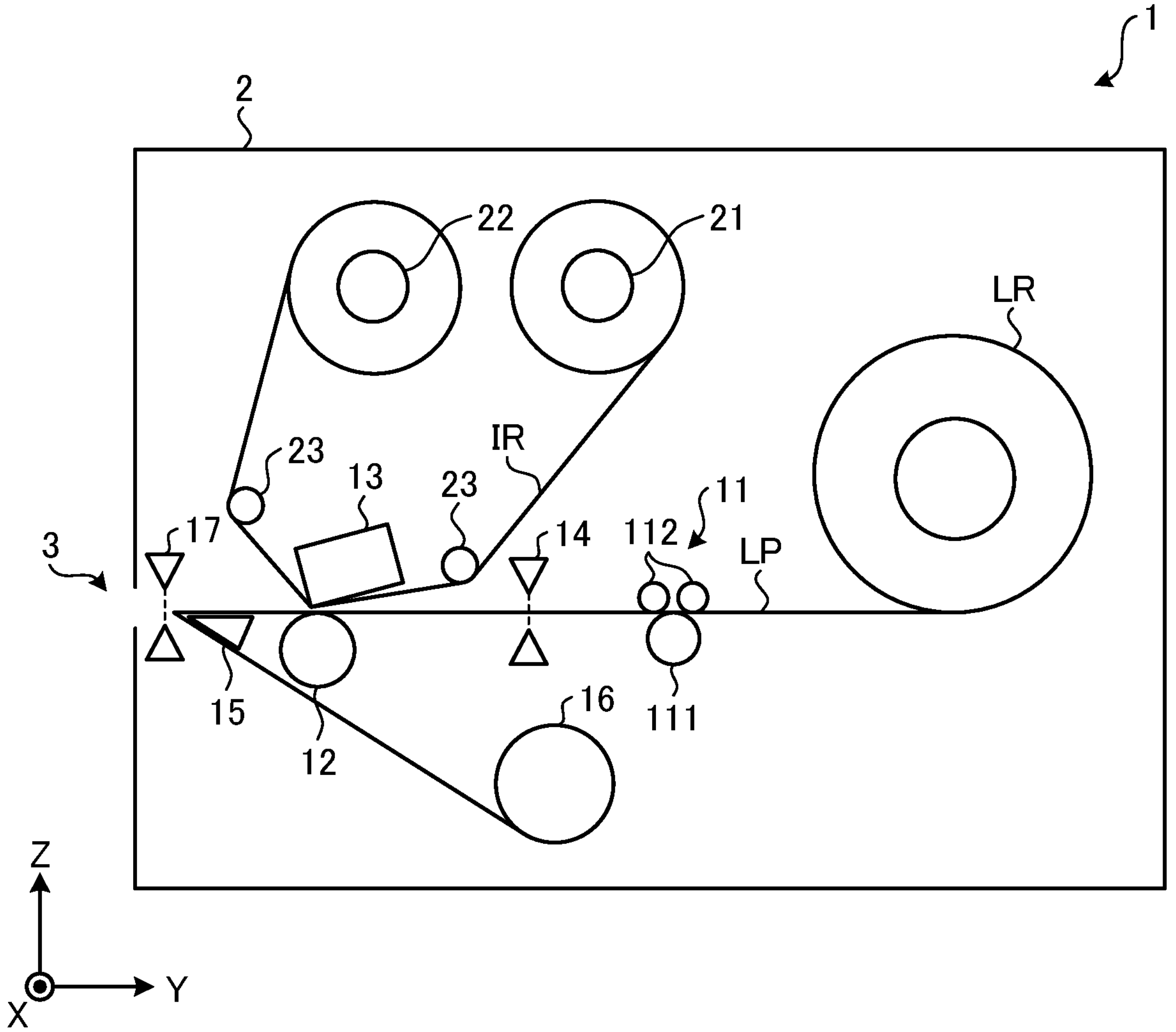
FIG. 1 is a schematic diagram of a label printer according to an embodiment.

FIG. 1 is a schematic diagram of a label printer 1 according to an embodiment. The label printer 1 is an example of a printer in the present disclosure.

The label printer 1 has a housing 2 that stores a label roll LR in which a label sheet LP, which is an example of a print sheet, is wound in a roll shape. On the label sheet LP, a plurality of labels L are attached to a long base sheet M at predetermined intervals (see FIG. 3). The label printer 1 performs printing on the label L while pulling out the label sheet LP from the label roll LR.

The label printer 1 includes conveyance rollers 11, a platen roller 12, a print head 13, an inter-label detection sensor 14, a peeling guide 15, a winding roller 16, and a peeling detection sensor 17 inside the housing 2. Further, the label printer 1 includes a ribbon holding shaft 21, a ribbon winding shaft 22, and guide shafts 23 inside the housing 2.

The conveyance rollers 11 include a capstan roller 111 and two auxiliary rollers 112. The label sheet LP drawn out from the label roll LR is inserted between the capstan roller 111 and the auxiliary rollers 112. The platen roller 12 is disposed at a position facing the print head 13. The label sheet LP is inserted between the platen roller 12 and the print head 13.

The capstan roller 111 and the platen roller 12 are rotationally driven by a first drive motor 106 (see FIG. 2), which will be described later. For example, the first drive motor 106 rotates the capstan roller 111 and the platen roller 12 counterclockwise to convey the label sheet LP toward a discharge port 3 in −Y direction when printing on the label sheet LP. Further, after the completion of the printing, the first drive motor 106 rotates the capstan roller 111 and the platen roller 12 clockwise and conveys the label sheet LP in the reverse direction, i.e., +Y direction to set the subsequent label L at the print start position.

Hereinafter, the rotation and the rotation direction of the first drive motor 106, the capstan roller 111, and the platen roller 12 when the label sheet LP is conveyed in −Y direction are also referred to as "forward rotation". Further, the rotation and the rotation direction of the first drive motor 106, the capstan roller 111, and the platen roller 12 when the label sheet LP is conveyed in the +Y direction are referred to as "reverse rotation".

The print head 13 is an example of a print unit. The print head 13 of the present embodiment is a thermal head in which a plurality of heating elements are aligned. The print head 13 prints on the label L of the label sheet LP sandwiched between the platen roller 12 and the print head 13 by causing the heating elements corresponding to a print pattern to generate heat.

Specifically, an ink ribbon IR is inserted between the platen roller 12 and the print head 13. The ink applied to the ink ribbon IR is transferred to the label L on the label sheet LP by the heated print head 13.

Here, the ink ribbon IR is suspended between the ribbon holding shaft 21 and the ribbon winding shaft 22. The ribbon holding shaft 21 winds an unused portion of the ink ribbon IR in a roll shape. The ribbon winding shaft 22 is a shaft for winding a used portion of the ink ribbon IR. The guide shafts 23 are guide members for guiding the ink ribbon IR suspended between the ribbon holding shaft 21 and the ribbon winding shaft 22 to a predetermined position. The ribbon winding shaft 22 is rotationally driven in a clockwise direction by a motor (not shown) when printing the label sheet LP, and takes up the ink ribbon IR after printing.

The print head 13 is moved up and down by a moving mechanism (not shown) such as a solenoid. Thus, in the label printer 1, it is possible to switch between a state in which the print head 13 is in contact with the platen roller 12 and a state in which the print head 13 is not in contact with the platen roller 12. The print head 13 is brought into contact with the platen roller 12 at the time of printing on the label sheet LP. The ribbon winding shaft 22 winds the ink ribbon IR at a speed corresponding to the conveyance speed of the label sheet LP while printing is performed, and stops winding when the print head 13 is not in contact with the ink ribbon.

The inter-label detection sensor 14 is provided on a conveyance path of the label sheet LP between the conveyance rollers 11 and the platen roller 12. The inter-label detection sensor 14 detects a position of a gap between the labels L from the label sheet LP (hereinafter referred to as a label gap). Specifically, the inter-label detection sensor 14 detects, as the position of the gap between the labels, a part of the label sheet LP where the light reception level is equal to or higher than a predetermined threshold when the label sheet LP is conveyed. The inter-label detection sensor 14 is, for example, a transmissive-type sensor including a light-emitting element and a light-receiving element.

The label printer 1 determines the position of the label L from the position of the label gap detected by the inter-label detection sensor 14, and performs position adjustment for positioning the label L at the print start position of the print head 13, adjustment of the printing timing, and the like.

The label sheet LP on which the printing is completed is separated into the base sheet M and the label L in the peeling guide 15. The peeling guide 15 is a V-shaped columnar member having two surfaces intersecting each other at an acute angle. The peeling guide 15 extends along the X direction. The peeling guide 15 bends the label sheet LP conveyed toward the discharge port 3 to peel off the label L from the base sheet M. The peeled backing sheet M is wound on the winding roller 16, while the label L peeled off from the backing sheet M is discharged or issued from the discharge port 3 provided in the housing 2.

The winding roller 16 winds the base sheet M from which the label L has been peeled off. The winding roller 16 is rotationally driven by a second drive motor 107 (see FIG. 2), which will be described later. For example, when printing on the label sheet LP, the second drive motor 107 rotates the winding roller 16 counterclockwise, and winds the base sheet M (i.e., the label sheet LP) from which the label L has been peeled off onto the winding roller 16.

Hereinafter, the rotation and the rotation direction of the second drive motor 107 and the winding roller 16 when the label sheet LP is wound are referred to as "forward rotation". Further, the rotation and the rotation direction of the second drive motor 107 and the winding roller 16 when rotating in the direction opposite to the forward rotation are referred to as "reverse rotation". The rotational direction of the winding roller 16 at the time of the forward rotation corresponds to the winding direction of the label sheet LP.

The peeling detection sensor 17 is installed in the vicinity of the discharge port 3, and detects the presence or absence of the label L peeled off from the base sheet M. The peeling detection sensor 17 is, for example, a transmissive-type sensor including a light-emitting element and a light-receiving element.

When the peeling detection sensor 17 detects the label L, the label printer 1 pauses the conveyance and printing of the label sheet LP. When a user removes the label L from the discharge port 3, the peeling detection sensor 17 detects that the label L does not exist. When it is detected by the peeling detection sensor 17 that the label L does not exist, the label printer 1 resumes the conveyance and printing of the label sheet LP.

Specifically, when resuming printing, the label printer 1 causes the label sheet LP to be conveyed by a predetermined amount in a direction opposite to the conveyance direction at the time of printing, in order to return the next label L following the label L that has been peeled off to the print start position of the print head 13. When the label printer 1 completes the conveyance in the reverse direction, the label printer 1 prints on the next label L, and issues the label L on which the printing is completed from the discharge port 3. Hereinafter, the conveyance of the label sheet LP at the time of printing is referred to as "feed", and its conveyance direction is referred to as "feed direction". Further, the conveyance for returning the label sheet LP to the print start position is also referred to as "back feed", and its conveyance direction is referred to as "back feed direction".

Figure 2:
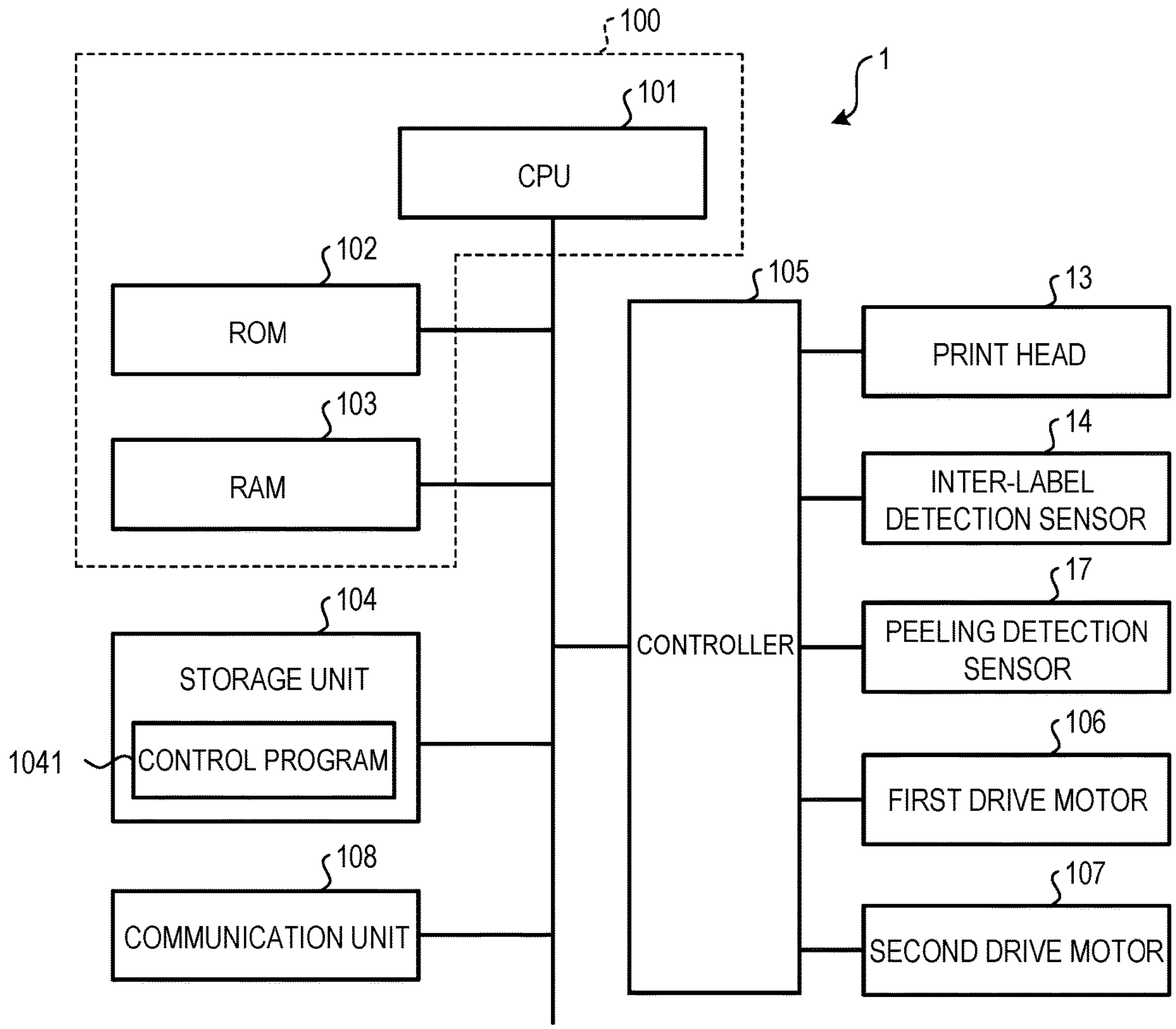
FIG. 2 is a hardware block diagram of the label printer.

Next, a hardware configuration of the label printer 1 will be described with reference to FIG. 2. FIG. 2 is a hardware block diagram of the label printer 1.

As illustrated in FIG. 2, the label printer 1 includes a CPU (Central Processing Unit) 101, a ROM (Read Only Memory) 102, and a RAM (Random Access Memory) 103.

The CPU 101 is a processor for controlling the label printer 1. The ROM 102 stores various programs. The RAM 103 temporarily stores programs and various types of data. The CPU 101, the ROM 102 and the RAM 103 are connected via a bus and the like. The CPU 101, the ROM 102, and the RAM 103 constitute a control unit 100. That is, the CPU 101 of the control unit 100 executes a control process related to the operation of the label printer 1 in accordance with a control program 1041 stored in the ROM 102 or a storage unit 104 described later and loaded onto the RAM 103.

The storage unit 104 is a non-volatile memory such as an HDD (Hard Disc Drive) or a flash memory in which the storage data is held even when the power is turned off. The storage unit 104 stores the control program 1041 for controlling the operation of the label printer 1. Further, the storage unit 104 stores various pieces of setting information related to the operation of the label printer 1.

The control unit 100 is connected to a controller 105 that controls input and output of data via the bus or the like. The controller 105 is connected to the first drive motor 106, the second drive motor 107, and the like in addition to the above-described print head 13, the inter-label detection sensor 14, and the peeling detection sensor 17.

The first drive motor 106 is a drive source for the conveyance rollers 11 (e.g., the capstan roller 111) and the platen roller 12. The second drive motor 107 is a drive source of the winding roller 16. The first drive motor 106 and the second drive motor 107 are, for example, stepping motors. Here, the first drive motor 106 functions as a conveyance unit that conveys the label sheet LP in the feed direction (i.e., the forward direction) and the back feed direction (i.e., the reverse direction) together with the conveyance rollers 11 and the platen roller 12 described above.

In the present embodiment, the drive source of the conveyance rollers 11 and the platen roller 12 is the first drive motor 106, but a drive source may be provided for each roller. In the present embodiment, at least the conveyance rollers 11, the platen roller 12, and the winding roller 16 are driven by different driving sources.

The controller 105 outputs the detection results of the inter-label detection sensor 14 and the peeling detection sensor 17 to the control unit 100. In addition, the controller 105 receives an instruction from the control unit 100 and controls the operation of each unit of the label printer 1. For example, the controller 105 controls the operations of the first drive motor 106 and the second drive motor 107 to feed the label sheet LP at a predetermined conveyance rate or back feed the label sheet LP at a predetermined conveyance rate.

The control unit 100 is connected to a communication unit 108 via the bus or the like. The communication unit 108 is a network interface circuit that communicates with an external device such as an information processing device via a communication line (not shown). For example, the communication unit 108 acquires a print instruction and print data to be printed on the label L from such an external device. The communication line may be a wired communication line or a wireless communication line.

The hardware configuration of the label printer 1 is not limited to the configuration of FIG. 2. For example, the label printer 1 may include an operation unit for receiving an operation from a user, a display unit for displaying various types of information, and the like.

In the label printer 1 having the above-described configuration, the control unit 100 controls each unit of the label printer 1 by executing the control program 1041, and performs printing while conveying the label sheet LP. Hereinafter, a printing operation of the label printer 1 will be described with reference to FIGS. 3 to 6.

For example, when printing of print data is instructed via the communication unit 108, an operation unit (not shown), or the like, the control unit 100 drives the first drive motor 106 and the second drive motor 107 via the controller 105 to cause the conveyance rollers 11, the platen roller 12, and the winding roller 16 to rotate forward. Accordingly, the label sheet LP drawn out from the label roll LR is conveyed toward the discharge port 3.

When a gap between labels is detected by the inter-label detection sensor 14 as the label sheet LP is conveyed, the control unit 100 receives a detection signal via the controller 105. Next, the control unit 100 specifies, for example, a print timing at which printing is performed by the print head 13 based on a predetermined conveyance speed of the label sheet LP and an arrangement position of the print head 13 in the conveyance path.

Subsequently, the control unit 100 applies a voltage to the heating elements of the print head 13 via the controller 105 to print an image (e.g., a character string or the like) corresponding to the print data on the label L of the label sheet LP based on the specified print timing.

Figure 3:
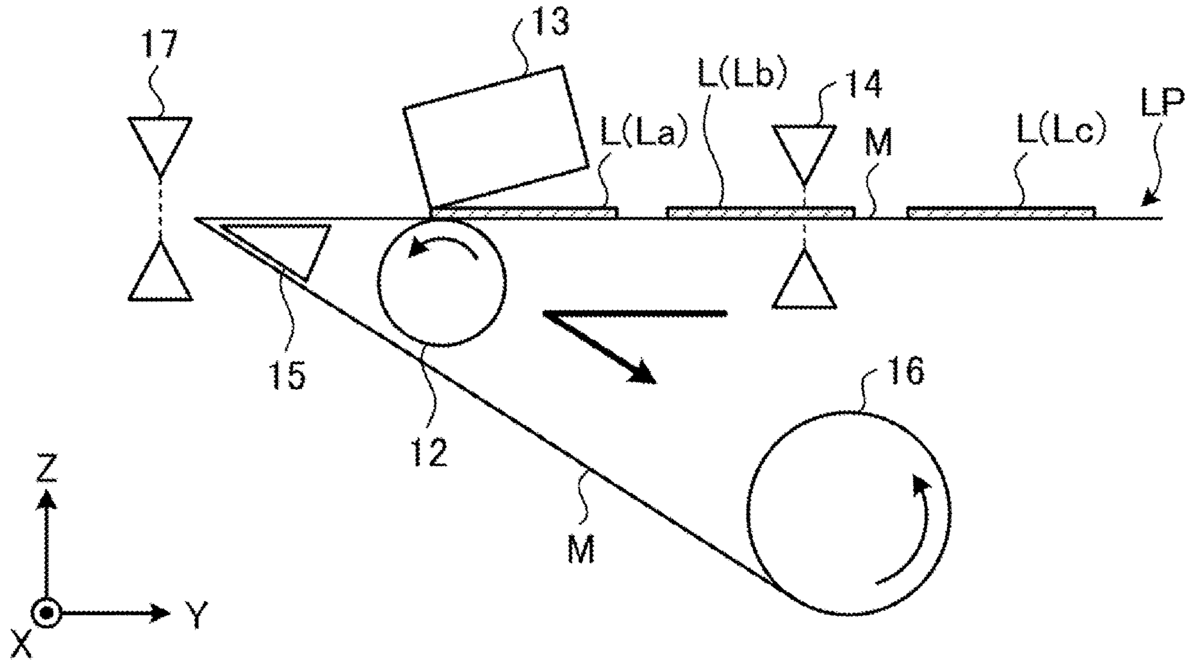
FIGS. 3-6 are diagrams for explaining a printing operation of the label printer.

FIG. 3 is a diagram for explaining the printing operation of the label printer 1. In FIG. 3, among the parts shown in FIG. 1, the platen roller 12, the print head 13, the inter-label detection sensor 14, the peeling guide 15, the winding roller 16, and the peeling detection sensor 17 are shown for illustration purpose, and the same applies to FIGS. 4 to 6.

In FIG. 3, among labels La, Lb, Lc arranged on the label sheet LP, the leading end of the preceding label La is conveyed to the position of the print head 13 (i.e., the print start position). Further, an arrow direction indicated by a solid line in the drawing indicates a conveyance direction of the label sheet LP to be fed. The fed label sheet LP is folded back by the peeling guide 15 and is wound up by the winding roller 16.

When the printing of the label L is completed, the control unit 100 controls the rollers 12 and 16 to convey the label sheet LP in the feeding direction. When the label L peeled off by the peeling guide 15 is detected by the peeling detection sensor 17 along with the conveyance of the label sheet LP, the control unit 100 receives the detection signal via the controller 105. Next, the control unit 100 stops the conveyance of the label sheet LP.

Figure 4:
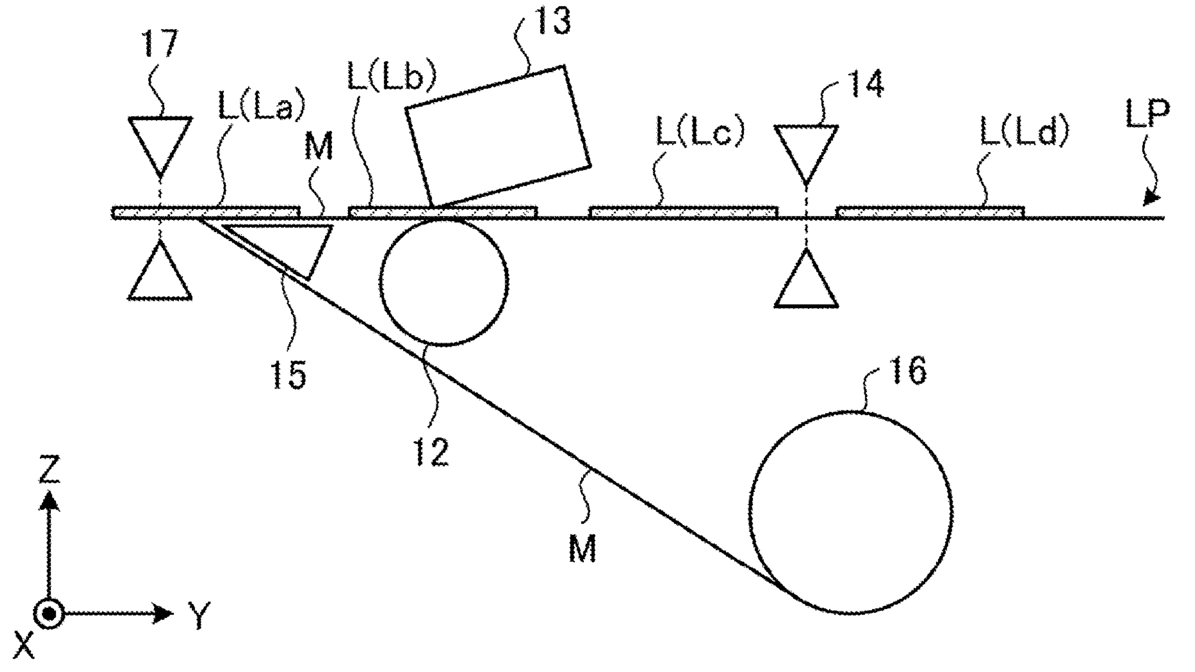

FIG. 4 shows that printing of the label La shown in FIG. 3 is completed and the label La is conveyed to the discharge port 3. In FIG. 4, the control unit 100 stops feeding and waits until the label La is removed.

Figure 5:
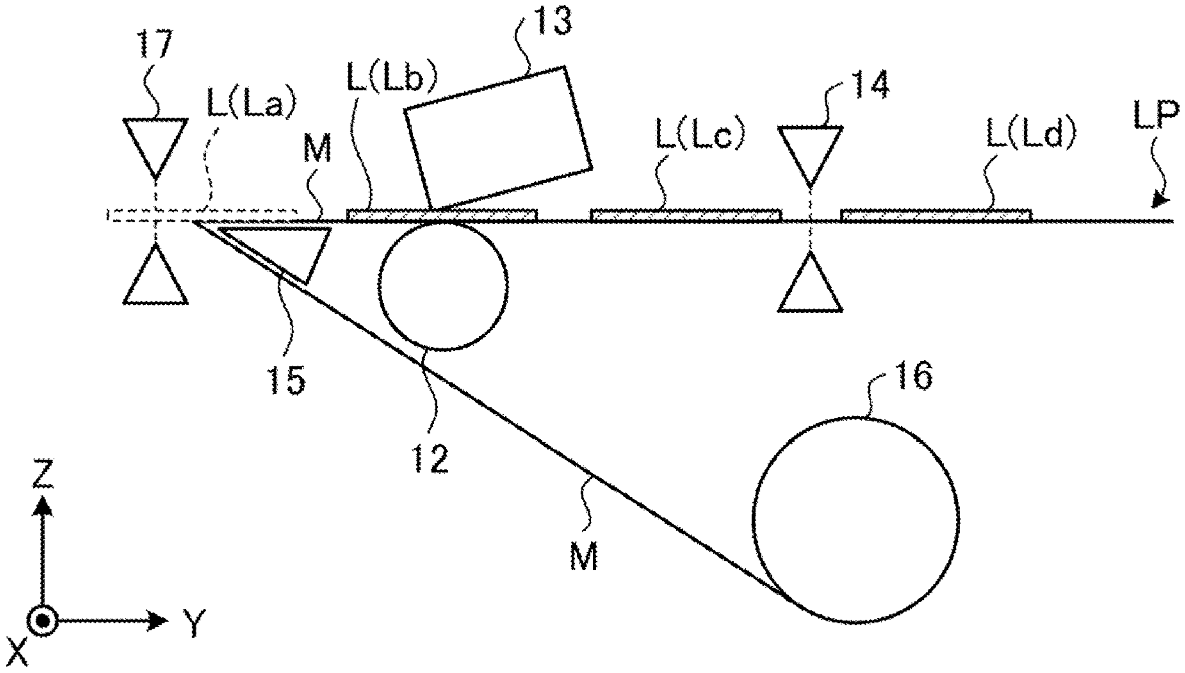

In the condition of FIG. 4, the user removes the label La discharged from the discharge port 3. FIG. 5 shows the state in which the label La is removed from the state in FIG. 4. When the label La is removed, the peeling detection sensor 17 detects that there is no label La.

Figure 6:
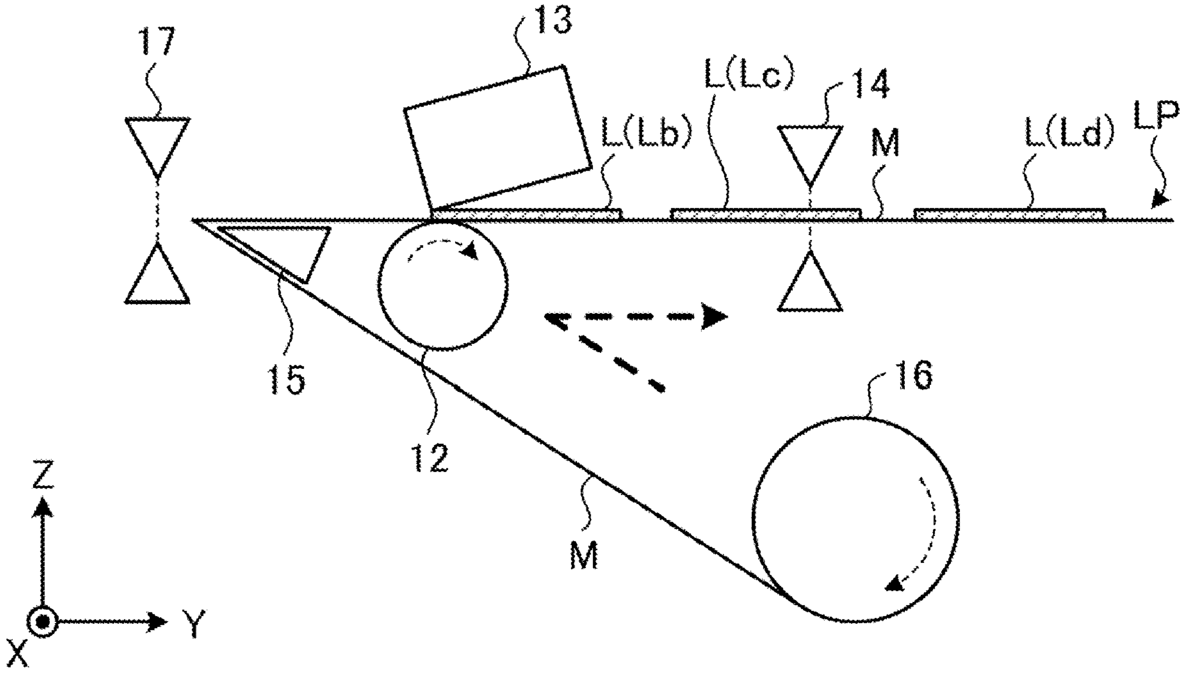

In the state shown in FIG. 5, the leading end of the label Lb following the label La has passed through the print head 13. Therefore, as shown in FIG. 6, the control unit 100 returns the leading end of the label Lb to the print start position of the print head 13 by back feeding the label sheet LP by a predetermined amount. Note that an arrow direction indicated by a broken line in the drawing indicates a conveyance direction of the label sheet LP to be back-fed.

Then, when printing on the label L is continuously performed, the control unit 100 performs printing on the label Lb while feeding the label sheet LP as described with reference to FIGS. 3 to 5. When printing is performed after the label Lc, the operations of FIGS. 6, 3 to 5 are repeatedly executed.

Incidentally, when back feeding the label sheet LP, the first drive motor 106 is rotated in reverse, and the label sheet LP (i.e., the base sheet M) wound up by the winding roller 16 is pulled out. At this time, the first drive motor 106 draws the label sheet LP wound on the winding roller 16 from the winding roller 16 while resisting the loads caused by the non-exciting torque or the like of the second drive motor 107. Therefore, when the back feed is performed, slippage is likely to occur in the conveyance of the label sheet LP due to the effect of the loads, and there is a possibility that the conveyance cannot be accurately performed.

Specifically, the label sheet LP is back-fed by the fixed amount of conveyance so that the next label L reaches the print start position of the print head 13, but there is a possibility that the actual amount of conveyance varies due to the slippage of the roller conveyance. In this case, the printing position on the label L is displaced, and thus there is a possibility that the printing accuracy is lowered.

It should be noted that there is a method of adjusting the position based on the detection result by back feeding the label sheet LP to a position detectable by the inter-label detection sensor 14. However, such a method increases the total amount of conveyance, and thereby reducing printing performance.

The label printer 1 of the present embodiment includes a drive train for accurately back feeding the label sheet LP without decreasing printing performance. Hereinafter, the drive train included in the label printer 1 will be described with reference to FIGS. 7 and 8.

Figure 7:
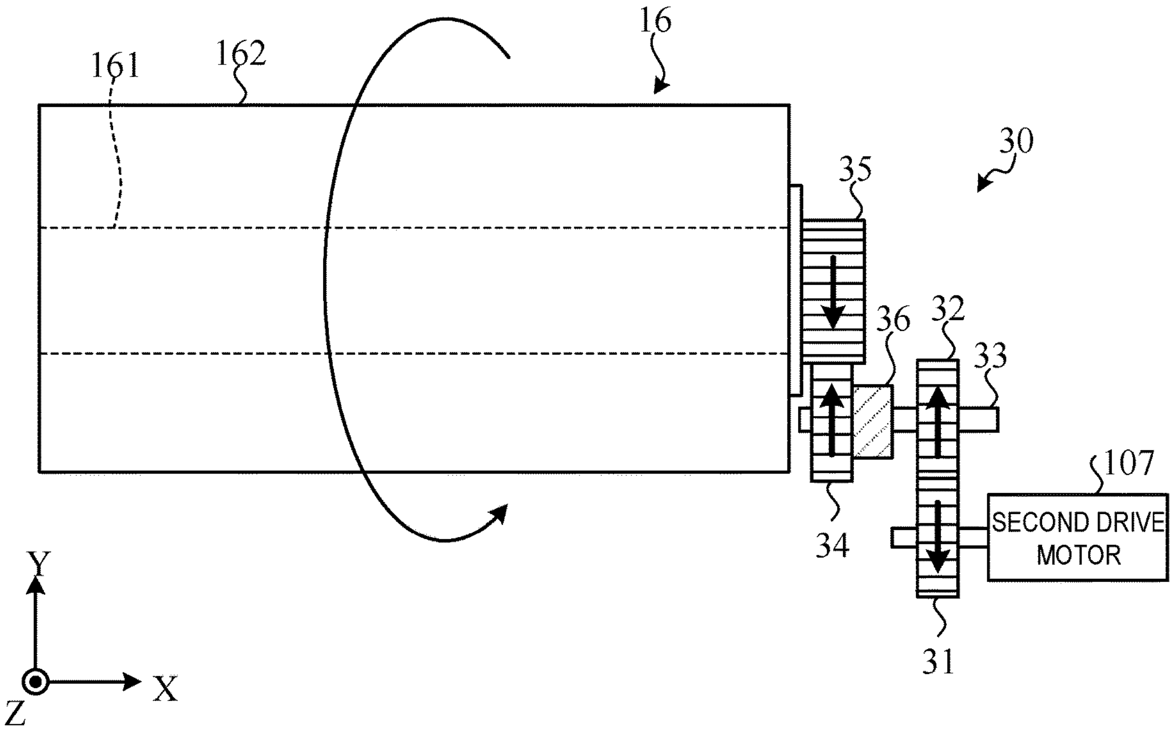
FIG. 7 is a diagram of a drive train related to a rotational drive of a winding roller according to an embodiment.
Figure 8:
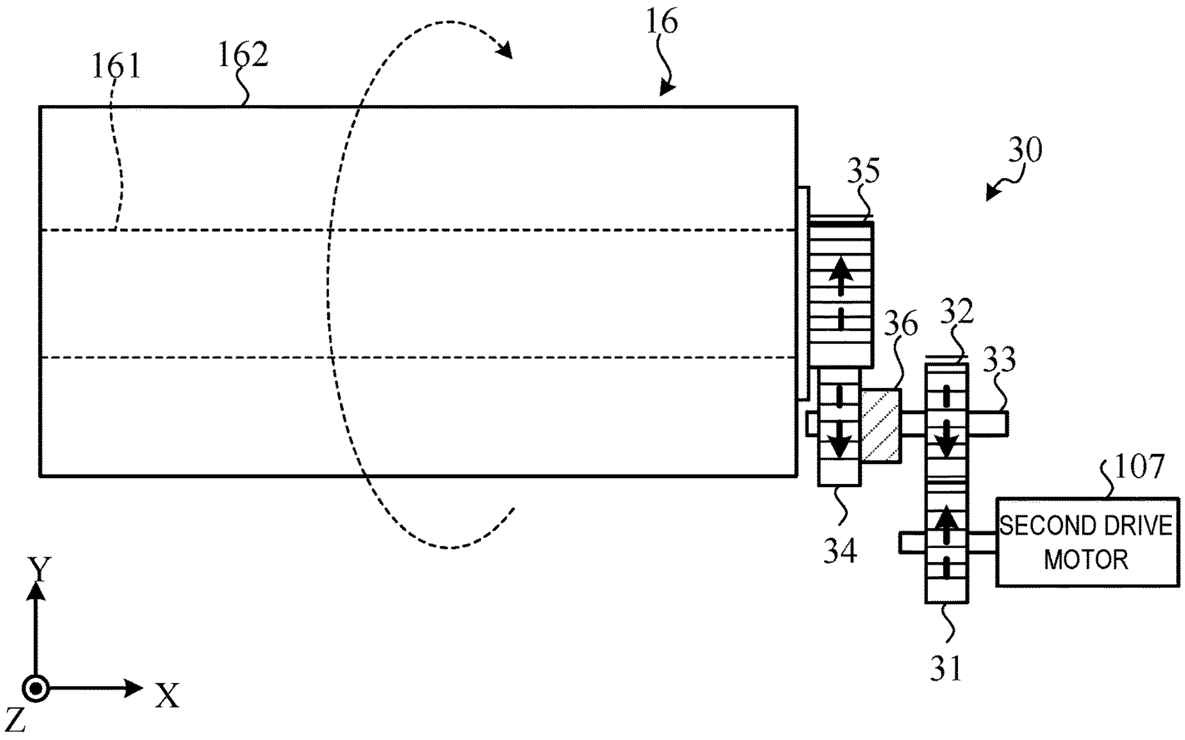
FIG. 8 is a diagram of a drive train related to the rotational drive of the winding roller.

FIG. 7 and FIG. 8 are diagrams illustrating an example of a drive train 30 related to the rotational drive of the winding roller 16. FIG. 7 and FIG. 8 show the winding roller 16 as viewed from the Z direction.

The winding roller 16 includes a winding shaft 161 serving as a rotation shaft, and a sleeve 162 provided around the winding shaft 161. The winding shaft 161 is an axis of the winding roller 16 and is rotatable in the axial direction. The sleeve 162 is formed of a material such as rubber, and is provided around the winding shaft 161.

The winding shaft 161 is rotationally driven by the driving force of the second drive motor 107 via the drive train 30 illustrated in FIGS. 7 and 8.

The drive train 30 is provided between the winding roller 16 and the second drive motor 107. The drive train 30 includes a first gear 31, a second gear 32, a shaft portion 33, a third gear 34, a fourth gear 35, and a one-way clutch 36. The first gear 31 is provided, for example, on the rotation shaft of the second drive motor 107 and rotates by the driving force of the second drive motor 107. The first gear 31 meshes with the second gear 32. The second gear 32 includes the shaft portion 33. The third gear 34 is attached to the shaft portion 33. The third gear 34 meshes with the fourth gear 35 fixed to the end of the winding shaft 161.

The third gear 34 is attached to the shaft portion 33 via the one-way clutch 36. The one-way clutch 36 is a clutch mechanism that transmits a rotational force to the third gear 34 at the time of feeding, and shuts off the drive from the third gear 34 at the time of back feeding.

In the above-described configuration, when feeding the label sheet LP, the second drive motor 107 rotates the drive train 30 in the first direction (i.e., the direction indicated by the solid arrow in FIG. 7) under the control of the control unit 100. In this case, the driving force of the second drive motor 107 is transmitted to the winding shaft 161 via the first gear 31, the second gear 32, the third gear 34, and the fourth gear 35, and causes the winding roller 16 to rotate forward. Thus, the winding roller 16 performs a winding operation of the fed label sheet LP.

On the other hand, when the label sheet LP is back-fed, the label sheet LP wound on the winding roller 16 is pulled out by the reverse rotation of the platen roller 12, so that the winding roller 16 is also reversed. At this time, the drive train 30 receives the rotational force rotating in the second direction opposite to the first direction (i.e., the direction indicated by the broken line arrow in FIG. 8), but since the one-way clutch 36 is in the idling state by the second drive motor 107, the winding roller 16 rotates independently from the first gear 31, the second gear 32, and the second drive motor 107.

It is preferable that the second drive motor 107 is reversed prior to the reversal of the first drive motor 106 in order to achieve the idling condition of the one-way clutch 36 when the label sheet LP is back-fed.

Specifically, the idling state of the one-way clutch 36 is achieved when the control unit 100 drives the second drive motor 107 in reverse prior to the reverse driving of the first drive motor 106. More specifically, the control unit 100 drives the second drive motor 107 in reverse such that a first rotational speed n1 of the shaft portion 33 generated by pulling out the label sheet LP by the back feed and a second rotational speed n2 of the shaft portion 33 generated by the reverse drive of the second drive motor 107 are $n1<n2$. Further, although the first rotational speed n1 of the shaft portion 33 generated by pulling out the label sheet LP varies depending on the quantity of the label wound around the winding roller 16, the control unit 100 drives the second drive motor 107 in reverse so as to satisfy $n1<n2$ relation under any condition. This causes the one-way clutch 36 to idle.

Then, the control unit 100 causes the one-way clutch 36 to idle, and then causes the first drive motor 106 to reverse-rotate to back feed the label sheet LP by a predetermined amount. As a result, the control unit 100 conveys the next label L to the print start position of the print head 13.

In the idling state of the one-way clutch 36, since the winding roller 16 is unloaded, there is a possibility that slack occurs in the base sheet M due to the inertia of the rotation at the end of the back feed. Therefore, for example, as shown in FIG. 9, a torque limiter 37 that generates a constant load torque in rotation in the second direction may be added to the drive train 30 or the like of the winding roller 16 to apply an appropriate load to prevent the occurrence of slack.

Figure 9:
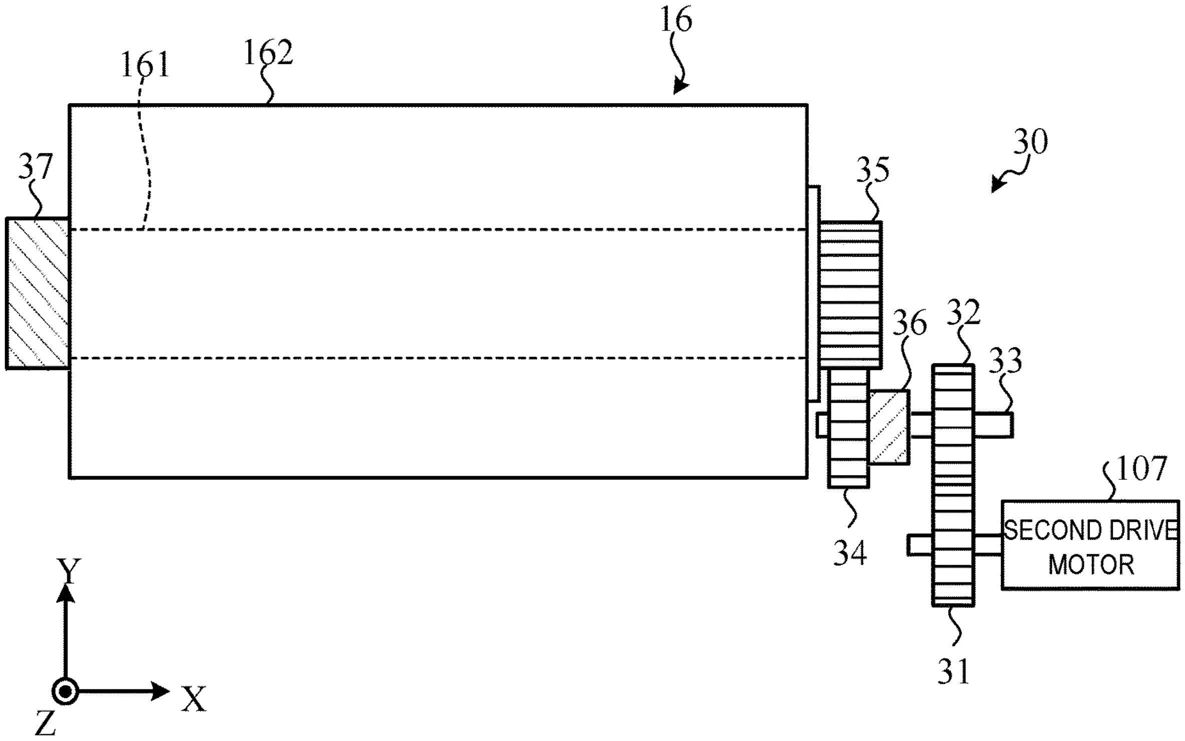
FIG. 9 is a diagram illustrating another configuration example of the drive train of the winding roller.

FIG. 9 is a diagram illustrating another configuration example of the drive train of the winding roller 16. FIG. 9 shows an example in which the torque limiter 37 is provided at the end of the winding shaft 161 that is different from the shaft end where the fourth gear 35 is provided. It is assumed that a load torque T1 of the torque limiter 37 is set to be $T2<T1<T3$ where T2 is an inertial torque generated in the winding roller 16 by the reverse drive of the second drive motor 107 and T3 is a torque generated in the winding roller 16 by the pull-out of the label sheet LP. As a result, the torque limiter 37 adds, to the winding roller 16, a load smaller than the torque T3 generated from the conveying force of the conveyance roller 11 and the platen roller 12 at the time of the back feed. At the end of the back feed, the torque limiter 37 applies a higher load to the winding roller 16 than the rotational moment of inertia (i.e., the inertial torque T2) remaining in the reversed winding roller 16. Therefore, in the label printer 1, back feed can be performed without causing slack in the base sheet M.

With the above-described configuration, the label printer 1 can perform back feeding of the label sheet LP without being affected by the loads of the second drive motor 107, so that it is possible to accurately align the label sheet with the print start position by the back feeding. Therefore, the label printer 1 can accurately perform printing on the label L.

Figure 10:
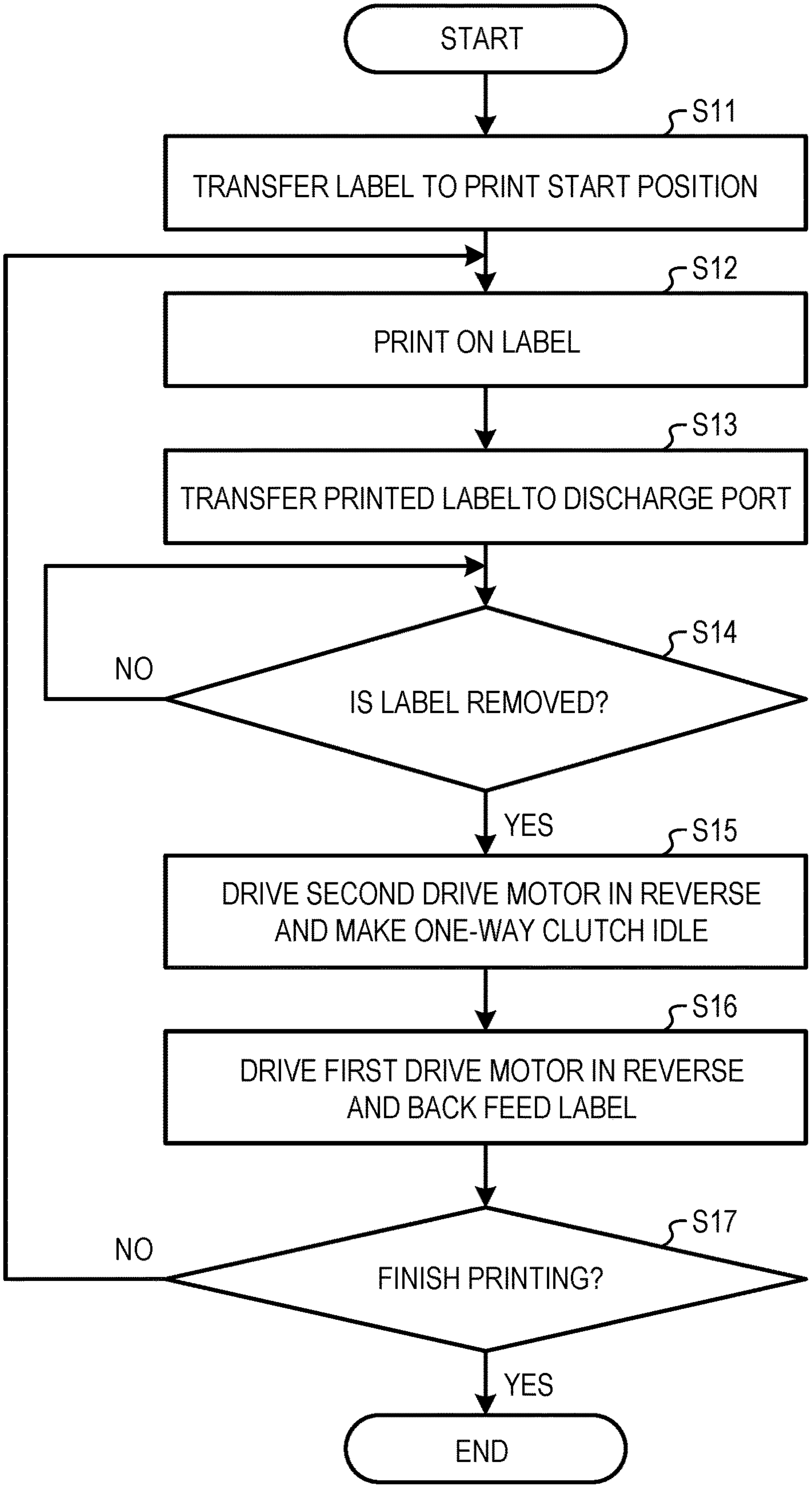
FIG. 10 is a flowchart of operations performed by the label printer.

Next, the operation of the label printer 1 will be described with reference to FIG. 10. FIG. 10 is a flowchart illustrating an example of an operation performed by the label printer 1.

First, the control unit 100 drives the first drive motor 106 and the second drive motor 107 in the forward direction to convey the label sheet LP including the label L to the print start position (step S11). When the label L reaches the print start position, the control unit 100 drives the print head 13 to print the label L (step S12).

When the printing is completed, the control unit 100 conveys the label sheet LP toward the discharge port 3 (step S13). As a result, the printed label L is discharged from the discharge port 3 in a state in which a part of the label L is peeled off from the base sheet M by the peeling guide 15.

Next, the control unit 100 waits until the label L is removed based on the detection result of the peeling detection sensor 17 (step S14; No). Upon detecting that the label L has been removed (step S14; Yes), the control unit 100 proceeds to step S15 in order to back feed the label sheet LP.

The control unit 100 drives the second drive motor 107 in reverse to idle the one-way clutch 36 of the drive train 30 (step S15). Next, the control unit 100 drives the first drive motor 106 in reverse to back feed the label sheet LP by a predetermined amount of conveyance in order to position the subsequent label L at the print start position (step S16). It is assumed that the control unit 100 drives the second drive motor 107 in reverse so that the first rotational speed n1 of the shaft portion 33 generated by pulling out the label sheet LP and the second rotational speed n2 of the shaft portion 33 generated by the reversing drive of the second drive motor 107 are n1<n2 to each other.

Subsequently, the control unit 100 determines whether to finish printing (step S17). For example, when it is instructed to continuously print on a plurality of labels L, the control unit 100 determines to continue printing (step S17; No), and returns the process to step S12. Then, the control unit 100 performs printing on the next label L positioned at the print start position.

Further, for example, when the designated number of labels L are printed, the control unit 100 determines that the printing is finished (step S17; Yes), and ends the present process.

As described above, the label printer 1 of the present embodiment includes, between the winding roller 16 and the second drive motor 107, the drive train 30 that transmits the rotational force in the winding direction in which the label sheet LP is wound on the winding roller 16, and sets the rotational force in the direction opposite to the winding direction to the idling state. Further, the label printer 1 drives the second drive motor 107 to rotate forward while the label sheet LP is being conveyed in the feed direction, and when the printed label L is discharged from the discharge port 3, the label sheet LP is conveyed by a predetermined amount in the back feed direction.

As a result, the label printer 1 can back feed the label sheet LP without being affected by the loads of the second drive motor 107, so that the back feed can be accurately performed. Therefore, since the label printer 1 can accurately align the label L to the print start position by the back feed, it is possible to improve the printing accuracy on the label L. Further, in the label printer 1, it is possible to suppress the amount of conveyance at the time of the back feed, and it is possible to improve the throughput.

In addition, the label printer 1 drives the second drive motor 107 in reverse prior to the back feed of the label sheet LP. Further, the label printer 1 drives the second drive motor 107 in reverse so that the second rotational speed n2 of the shaft portion 33 generated by the reverse drive of the second drive motor 107 is larger than the first rotational speed n1 of the shaft portion 33 generated by the pull-out of the label sheet LP. As a result, the one-way clutch 36 of the drive train 30 can be in the idling state prior to the back feed of the label sheet LP, and thus the back feed is performed in a state where the second drive motor 107 is unloaded.

Further, the label printer 1 further includes the torque limiter 37 that adds, to the winding roller 16, a load that is smaller than the torque generated in the winding roller 16 by pulling out the label sheet LP at the time of the back feed and is larger than the moment of inertia of the rotation remaining in the winding roller 16 at the time of the end of the back feed. As a result, the label printer 1 can perform the back feed without causing slack in the base sheet M, and thus it is possible to prevent the occurrence of a conveyance abnormality such as a meandering of the base sheet M.

It is to be noted that the above-described embodiments can be appropriately modified and implemented by changing a part of the configuration or the function of the label printer 1. Therefore, in the following, some modifications according to the above-described embodiments will be described as other embodiments. Note that, in the following, differences from the above-described embodiments will be mainly described, and detailed descriptions of the same points as those described above will be omitted. Further, the modification examples described below may be implemented individually or in combination as appropriate.

(Modification 1)

In the above-described embodiments, the drive train 30 is configured with four gears and the one-way clutch 36 is provided in the third gear 34, but the configuration of the drive train 30 is not limited to this. For example, the drive train 30 may comprise one to three, or five or more gears. Further, the one-way clutch 36 may be provided in any of the gears constituting the drive train 30, and may be provided in, for example, the second gear 32 described with reference to FIG. 7.

(Modification 2)

In the above-described embodiments, as described in the flowchart of FIG. 10, the back feed is performed before the printing is finished, but the present invention is not limited thereto, and the back feed may not be performed when the printing is finished. In this case, the label printer 1 may perform the step S15 and the step S16 at the time of resuming the printing, thereby performing the back feed at the print start position. Further, the label printer 1 may perform back feed the label sheet LP to a position at which the labels L are detectable by the inter-label detection sensor 14 when a printing is resumed.

The program executed by the label printer 1 of the above-described embodiments is stored in advance in the ROM 102, the storage unit 104, or the like. The program executed by the label printer 1 of the above-described embodiments may be recorded on a non-transitory computer-readable recording medium such as a CD-ROM, a flexible disk (FD), or a CD-R, DVD (Digital Versatile Disk) in an installable format or an executable format.

Further, the program executed by the label printer 1 of the above-described embodiments may be stored in a computer connected to a network such as the Internet, and may be downloaded via the network.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A printer for printing on a label sheet including a plurality of detachable labels, comprising:
- a platen roller configured to convey the label sheet;
- a first motor connected to the platen roller to rotate the platen roller;
- a print head facing the platen roller and configured to print on a label of the label sheet;
- a discharge port through which the printed label is discharged and detached;
- a winding roller for winding the label sheet from which the printed label has been detached;
- a second motor;
- a drive train by which a rotational force can be transmitted from the second motor to the winding roller; and
- a processor configured to:

control the first and second motors to rotate in a first direction to convey the label sheet in a forward direction along a conveyance path and control the print head to print on a first label of the label sheet, and after the printed first label is discharged, control the second motor to rotate in a second direction that is opposite to the first direction while the first motor is controlled to rotate in the first direction, and then control the first motor and the second motor to rotate in the second direction, wherein the drive train disengages the winding roller from the second motor when the second motor is controlled to rotate in the second direction.

2. The printer according to claim 1, wherein the drive train includes a one-way clutch by which the rotational force is transmitted from the second motor to the winding roller when the second motor rotates in the first direction.

3. The printer according to claim 2, wherein the one-way clutch disengages the winding roller from the second motor when the second motor rotates in the second direction.

4. The printer according to claim 2, wherein the drive train further includes a first gear that is connected to the second motor and a second gear that meshes with the first gear and rotates a shaft to which the one-way clutch is connected.

5. The printer according to claim 4, wherein the drive train further includes a third gear that is connected to the shaft via the one-way clutch and a fourth gear that meshes with the third gear and is connected to the winding roller.

6. The printer according to claim 1, wherein the processor is configured to control the second motor to rotate in the second direction at a speed that is greater than a predetermined speed.

7. The printer according to claim 1, further comprising:

a torque limiter connected to the winding roller and configured to limit a load torque on the winding roller in a direction opposite to a direction in which the label sheet is wound.

8. The printer according to claim 7, wherein the load torque is greater than a torque on the winding roller generated by the second motor rotated in the second direction and smaller than a torque on the winding roller caused by the label sheet conveyed in a reverse direction along the conveyance path opposite to the forward direction.

9. The printer according to claim 1, further comprising:

a sensor configured to detect presence or absence of a label in the discharge port, wherein the processor is configured to, when the sensor detects absence of the printed first label after the printed first label is discharged, control the first and second motors to rotate in the second direction.

10. A method carried out by a printer that includes:

a platen roller configured to convey a label sheet, a first motor connected to the platen roller to rotate the platen roller, a print head facing the platen roller and configured to print on a label of the label sheet, a discharge port through which the printed label is discharged and detached, a winding roller for winding the label sheet from which the printed label has been detached, a second motor, and a drive train by which a rotational force can be transmitted from the second motor to the winding roller, the method comprising:

controlling the first and second motors to rotate in a first direction to convey the label sheet in a forward direction along a conveyance path and controlling the print head to print on a first label of the label sheet;

discharging the printed first label through the discharge port; and controlling the second motor to rotate in a second direction that is opposite to the first direction while the first motor is controlled to rotate in the first direction, and then controlling the first motor and the second motor to rotate in the second direction, wherein the drive train disengages the winding roller from the second motor when the second motor is controlled to rotate in the second direction.

11. The method according to claim 10, wherein the drive train includes a one-way clutch by which the rotational force is transmitted from the second motor to the winding roller when the second motor is controlled to rotates in the first direction.

12. The method according to claim 11, wherein the one-way clutch disengages the winding roller from the second motor when the second motor rotates in the second direction.

13. The method according to claim 11, wherein the drive train further includes a first gear that is connected to the second motor and a second gear that meshes with the first gear and rotates around a shaft to which the one-way clutch is connected.

14. The method according to claim 13, wherein the drive train further includes a third gear that is connected to the shaft via the one-way clutch and a fourth gear that meshes with the third gear and is connected to the winding roller.

15. The method according to claim 10, wherein controlling the first and second motors to rotate in the second direction includes controlling the second motor to rotate in the second direction at a speed that is greater than a predetermined speed.

16. The method according to claim 10, wherein the printer further includes a torque limiter connected to the winding roller, and the method further comprises limiting a load torque on the winding roller in a direction opposite to a direction in which the label sheet is wound.

17. The method according to claim 16, wherein the load torque is greater than a torque on the winding roller generated by the second motor rotated in the second direction and smaller than a torque on the winding roller caused by the label sheet conveyed in a reverse direction along the conveyance path opposite to the forward direction.

18. The method according to claim 10, further comprising:

detecting absence of the printed first label in the discharge port after the printed first label is discharged, wherein the first and second motors are rotated in the second direction upon detection of the absence of the printed first label.

* * * * *